Figure 1:
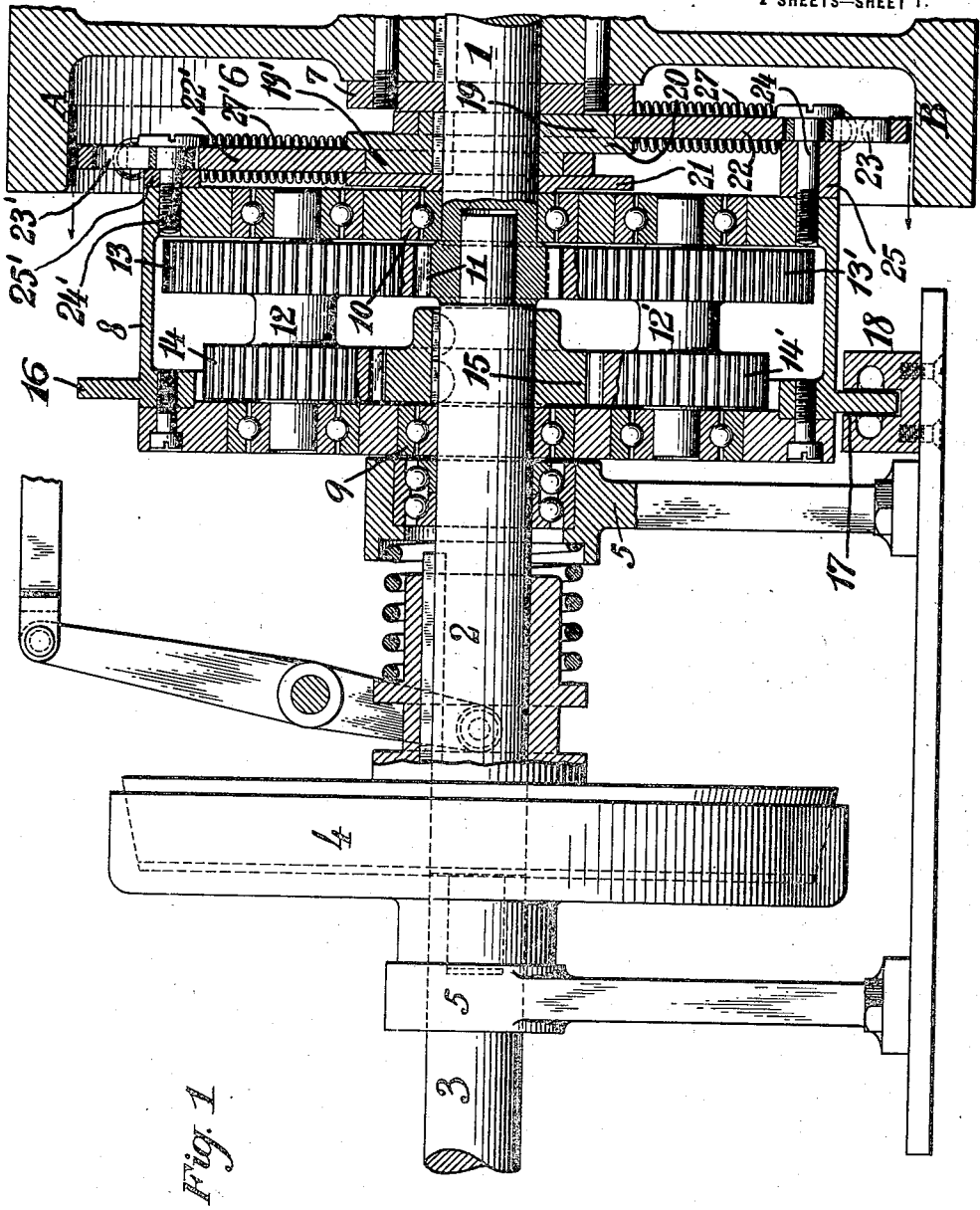

J. R. ROGERS.
DEVICE FOR TRANSMITTING POWER.
APPLICATION FILED APR. 6, 1916. RENEWED AUG. 7, 1920.

1,370,047.

Patented Mar. 1, 1921.
2 SHEETS—SHEET 1.

Inventor
John R. Rogers
By his Attorneys

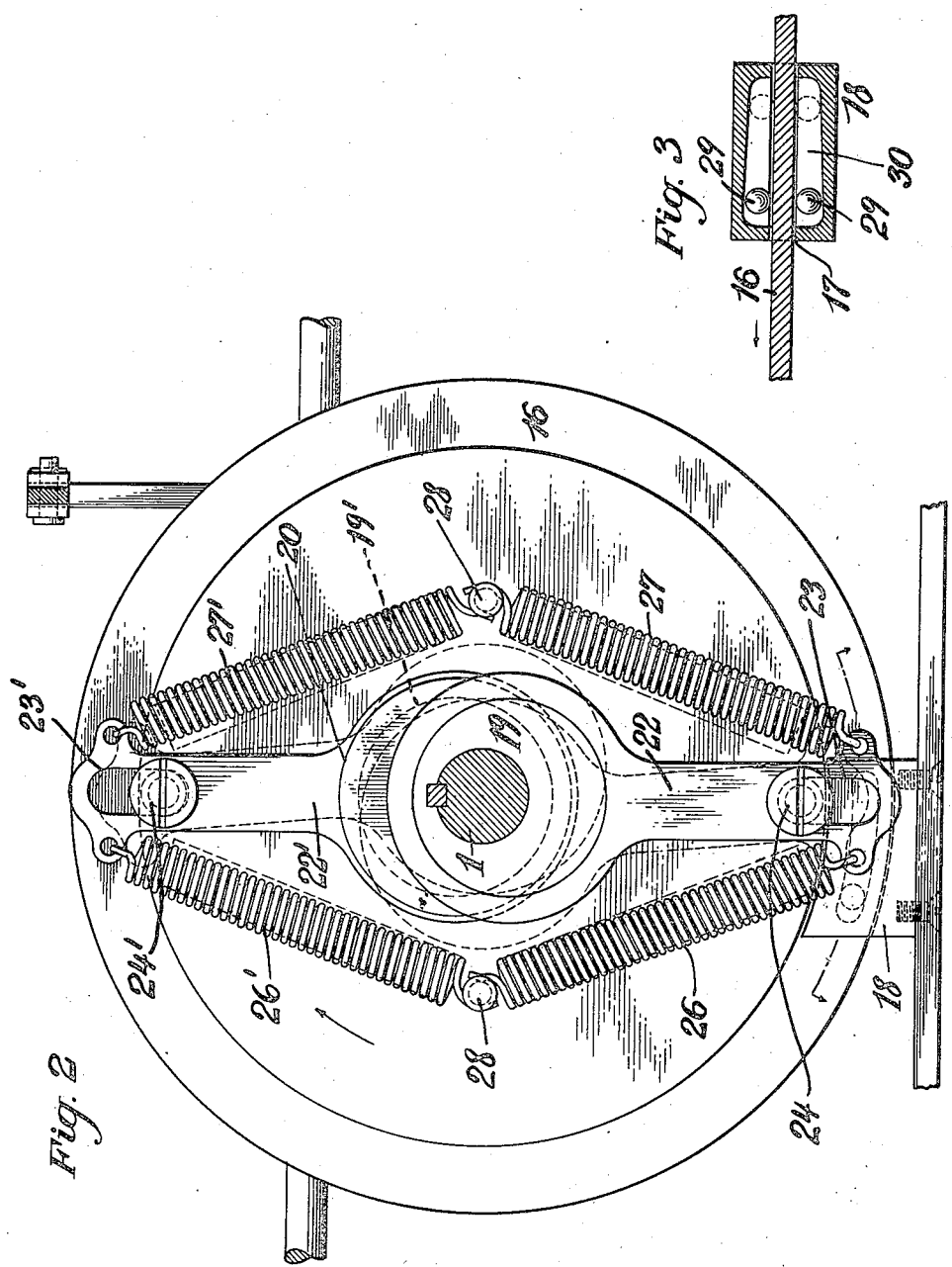

UNITED STATES PATENT OFFICE.

JOHN R. ROGERS, OF BROOKLYN, NEW YORK.

DEVICE FOR TRANSMITTING POWER.

1,370,047.  Specification of Letters Patent.  Patented Mar. 1, 1921.

Application filed April 6, 1916, Serial No. 89,304. Renewed August 7, 1920. Serial No. 402,032.

*To all whom it may concern:*

Be it known that I, JOHN R. ROGERS, a citizen of the United States of America, and resident of the borough of Brooklyn, county of Kings, city and State of New York, have invented certain new and useful Improvements in Devices for Transmitting Power, of which the following is a full, clear, and exact specification.

My present invention is an improvement upon that described and claimed in my application Serial No. 15202, filed March 18, 1915, and discloses certain forms or arrangements of apparatus further illustrating the application of the broad principles of that prior invention.

In the following I have described, in connection with the accompanying drawings, a form of device embodying the principles of this invention, the features thereof being more particularly pointed out hereinafter in the claims.

In the drawings, Figure 1 is a side view of the device partly in section and partly broken away; Fig. 2 is a cross sectional view of the device shown in Fig. 1 along the line A—B, looking in the direction of the arrows; Fig. 3 is a plan view, in section, of a locking means.

Similar numerals of reference indicate similar parts throughout the several views.

In the drawings 1 indicates the driving shaft 2, the driven shaft and 3 the Cardan shaft adapted to be driven by the driven shaft through the usual clutch mechanism 4, here shown as a cone clutch. The driven shaft 2 finds bearings in the driving shaft and the Cardan shaft in the usual way, 5, 5, indicating bearings for the driven shaft and the Cardan shaft arranged in accordance with the usual practice. Driving shaft 1 carries the usual fly-wheel 6 keyed to the shaft which is shown as having collar 7 bolted thereto, 8 indicates a drum or casing mounted to rotate on bearings 9 and 10 in turn mounted on the driven and driving shafts respectively. Drum 8 incloses the driving gear 11 fast on driving shaft 1 and carries, mounted in bearings in its walls, shafts 12 and 12′ carrying driven gears 13 and 14 and 13′ and 14′ respectively, gears 14 and 14′ being adapted to drive gear 15 keyed to the driven shaft 2. 16 indicates a flange projecting radially from the face of drum 8 and adapted to pass through a slot 17 in roller lock mechanism 18, for the purpose hereinafter set forth. 19 and 19′ indicate eccentrics keyed on driving shaft 1 and held in position between collars 7 and 20 and 20 and 21 respectively. 22 and 22′ indicate eccentric straps surrounding eccentrics 19 and 19′ respectively. 23 and 23′ indicate slots in eccentric straps 22 and 22′ respectively, near the outer ends thereof and 24 and 24′ indicate pins engaging slots 23 and 23′ respectively and mounted fast in the wall of drum 8. 25 and 25′ indicate collars surrounding pins 24 and 24′ respectively and lying between the respective eccentric straps and the wall of the drum. 26 and 27 and 26′ and 27′ indicate springs fastened at one end to pins 28 mounted fast in the wall of drum 8 and at the other end to the outer ends of eccentric straps 22 and 22′ respectively.

It will be noted that I have arranged the eccentrics 19 and 19′, the eccentric straps 22 and 22′, the gears 13 and 14 and 13′ and 14′ and the springs 26 and 27 and 26′ and 27′ in duplicate and that I have mounted said gears and springs upon the cylindrical casing, drum or gear-box 8. The said casing by its weight and shape is adapted to act as a fly-wheel. This fly-wheel effect is of importance as it enables the device to drop into intermediate and low speeds when the torque of the engine is less than the resistance of the springs. For example—when running along a level road with the throttle half open, the torque of the engine is sufficient to drive the car at a moderate speed in direct drive, the resistance of the springs being greater than the torque of the engine. If now a moderate incline is reached whereby the resistance of the driven shaft is considerably increased, even if the throttle is left untouched, the device will pass into intermediate and possibly low gear. In such case the momentum or power stored up in the casing is sufficient to carry the casing around, overcoming the resistance of the springs and causing the eccentric straps to work whereby the advantage of the gears is obtained and the device will go into intermediate or low gear in the same way as if the throttle was wide open, and the engine will not stall. This fly-wheel effect is of advantage when running at comparatively slow speeds in a crowded traffic.

The operation of the device as described is as follows:

Assuming that the engine has been started with the driving shaft 1 and its fly-wheel 6 turning and the clutch disengaged. The eccentrics 19 and 19' and the gear 11 being mounted fast on driving shaft 1 and the eccentric straps 22 and 22' through pins 24 and 24' being connected to drum 8, it will be seen that the rotation of the eccentrics tends to cause rotation of drum 8, because springs 26, 27 and 26', 27' are in strong tension and tend to resist the action of the eccentrics and hence, up to the limit of the tension of the springs, it is as if the eccentric straps were fastened solidly to the drum and incapable of movement relative thereto, so that eccentrics, eccentric straps and drum move as one. The rotation of driving shaft 1 thus carrying drum 8 around with it, through gears 11, 13, 14 and 15 being interlocked with each other and all moving with the drum, drives driven shaft 2 at the same speed so long as the clutch is disengaged. After speeding up the engine as usual, the clutch is permitted to come into engagement and the car tends to start. If the resistance of inertia of the car to be overcome in starting, is less than the tension of the springs 26, 27 and 26', 27', the clutch will slip slightly as usual and the car will start on "high gear" or "direct drive." If the resistance of inertia of the car is greater than the tension of the springs, the power or torque of the driving shaft is divided between the eccentrics and the gear 11. As the eccentrics go around they give an impulse at every revolution equal to the tension of the springs when they are most extended. The torque of the driving shaft acting on gear 11 is expended on gears 13 and 14, and 13' and 14', tending to drive gear 15 and the driven shaft at a speed proportional to the gears 11, 13, 14 and 15 which in the case illustrated is as three to one. In other words, the torque exerted through the eccentrics tends to drive the driven shaft in the ratio of one to one or at the speed of the driving shaft, while the torque exerted through gear 11 tends to drive the driven shaft in the ratio of three to one. The driven shaft will then turn at a speed proportional to the resistance against said driven shaft which will be somewhere intermediate between one to one and three to one. Experience shows that the torque transmitted through the gear and through the eccentrics automatically divides itself between the gear and the eccentrics in proportion to the resistance against the driven shaft.

If the resistance on the driven shaft is great enough the drum will entirely cease rotation and, through the action of the gears 15, 14, 13 and 11, will start to rotate in the opposite direction. This tendency to rotate backwardly will be stopped by the pinching of flange 16 in slot 17 of locking means 18, the movement of the flange in the direction opposite the arrow in Fig. 3 causing balls 29 to wedge between the walls of the lock and the flange because of the wedge-shaped chamber 30 of said lock. This form of lock is a well known mechanical device.

When the drum 8 stands still, the driving shaft revolving through the effort of the engine and fly-wheel, causes the eccentrics to drive the eccentric straps to extend the springs as above described. At this time the eccentric straps have and perform no function and the power expended in extending the springs is returned by their contraction; except the loss by friction on the eccentric straps, the entire torque of the driving shaft is then expended on the gear and the device operates exactly as the ordinary change gear device in "low" gear. As soon however as the resistance begins to decrease, the extension of the springs through the eccentrics tends to cause the drum 8 to rotate and the torque of the driving shaft once more divides itself automatically as above set forth, until the resistance becomes less than the power needed to extend the springs, whereupon the drum will rotate again at the same speed as the driving shaft and transmitting the same speed to the driven shaft the car will be driven in a manner corresponding exactly to the "direct drive" of the ordinary automobile.

It will be seen that in the use of this device it is not necessary for the driver or operator to shift the gears as the gears always remain in mesh. In driving along the road under ordinary conditions the tension of the springs should be such as to enable the entire mechanism to operate on "direct drive." When a hill is reached which would compel the driver with the ordinary change gear to shift into intermediate gear, the eccentric straps begin to work, the torque of the driving shaft is divided between the eccentrics and the gear as above described and this continues until the top of the hill or other place is reached where the tension of the springs is again able to restrain the eccentric straps and the car is driven in "direct drive."

If a very steep hill is reached which would compel the driver with the ordinary change gear to shift into low gear, the resistance will cause the drum to go slower and slower and finally stop, at which time, as above described, the torque of the driving shaft will be exerted entirely through the gear, the eccentric straps although working, simply reciprocating and giving back as much power as they take excepting that power lost by friction.

In connection with the foregoing I have not described any means for reversing the rotation of the driven shaft as such means is well understood by those skilled in the art and forms no part of my invention.

It is obvious that the details of arrangement and construction as herein shown and described may be considerably varied without departing from the spirit of my invention and I do not restrict myself to such details further than the scope of the appended claims demands. It is further clear that any mechanical equivalents may be substituted for the parts herein without departing from the invention; for example, the substitution of cranks for the eccentrics disclosed.

I would furthermore state that although I have shown and described my device in connection with the operation of an automobile, such mode of operation is merely illustrative and is not intended to confine the scope of the invention to such use, as it may readily be adapted to any use wherein the necessity for changing speed arises.

In this connection I would state that I have adapted the principles of the invention herein described to use in connection with clutch mechanism and that I intend to file a separate application to cover the same.

I claim:

1. In a device for transmitting power, a driving shaft, a gear thereon, a driven shaft, a gear thereon, gears connecting said driving and driven gears, a member carrying said connecting gears, an eccentric mounted on the driving shaft, a strap driven through said eccentric and a yielding connection between said strap and said member.

2. In a device for transmitting power, a driving shaft, a gear thereon, a driven shaft, a gear thereon, gears connecting said driving and driven gears, a rotatable member carrying said connecting gears, an eccentric mounted on the driving shaft, a strap driven through said eccentric and a yielding connection between said strap and said member.

3. In a device for transmitting power, a driving shaft, a gear thereon, a driven shaft, a gear thereon, gears connecting said driving and driven gears, a member carrying said connecting gears, means restraining said member from reverse rotation, an eccentric mounted on the driving shaft, a strap driven through said eccentric and a yielding connection between said strap and said member.

4. In a device for transmitting power, a driving shaft, a gear thereon, a driven shaft, a gear thereon, gears connecting said driving and driven gears, a member carrying said connecting gears, an eccentric mounted on the driving shaft, a strap driven through said eccentric and a connection between said strap and said member adapted to hold said strap against reciprocation when the resistance is slight so that all of the power is transmitted through the eccentric, to yield under greater resistance so that part of the power is transmitted through the eccentric and part through the gears, and to yield when the resistance is great to transmit all the power through the gears.

5. In a device for transmitting power, a driving shaft, a gear thereon, a driven shaft, a gear thereon, gears connecting said driving and driven gears, a member carrying said connecting gears and a connection between the driving shaft and said member adapted to yield when the resistance is great and on each revolution of the draving shaft to return the power expended in causing said yielding.

6. In a device for transmitting power, a driving shaft, a gear thereon, a driven shaft, a gear thereon, gears connecting said driving and driven gears, a rotatable casing in which said connecting gears are mounted, an eccentric mounted on the driving shaft, a strap driven through said eccentric and a yielding connection between said strap and said casing.

7. In a device for transmitting power, a driving shaft, a gear thereon, a driven shaft, a gear thereon, gears connecting said driving and driven gears, a rotatable casing in which said connecting gears are mounted, a flange on said casing, means for frictionally holding said flange to bring the casing against reverse rotation, an eccentric mounted on the driving shaft, a strap driven through said eccentric and a yielding connection between said strap and said casing.

8. In a device for transmitting power, a driving shaft, a gear thereon, a driven shaft, a gear thereon, a rotatable casing mounted on the driving and driven shafts, gears mounted in said casing connecting said driving and driven gears, a pin on said casing, an eccentric mounted on the driving shaft, a strap driven through said eccentric provided with a perforation for receiving said pin and a yielding connection between said strap and said casing.

9. In a device for transmitting power, a driving shaft, a gear thereon, a driven shaft, a gear thereon, a casing rotatably mounted on said driving and driven shafts, gears mounted in said casing connecting said driving and driven gears, an eccentric mounted on the driving shaft, a strap driven through said eccentric and a spring connecting said strap and said casing.

10. In a device for transmitting power, a driving shaft, a gear thereon, a driven shaft, a gear thereon, a casing rotatably mounted on said driving and driven shafts, gears mounted in said casing and a yielding connection between the driving shaft and said casing adapted to permit the casing to be driven directly by the driving shaft when the resistance to the driven shaft is slight and to hold said casing against rotation when said resistance is great.

11. In a device for transmitting power, a driving shaft, a gear thereon, a driven shaft, a gear thereon, gears connecting said driving and driven gears, a rotatable bearing carrying said connecting gears, and means actuated by the driving shaft for rotating said bearing, responsive to the resistance of the driven shaft controlling the action of said rotatable bearing.

In testimony whereof I have signed this specification.

JOHN R. ROGERS.